US011095194B2

(12) United States Patent
Tatebe

(10) Patent No.: US 11,095,194 B2
(45) Date of Patent: Aug. 17, 2021

(54) METHOD FOR PRODUCING STACKED CORE

(71) Applicant: TOYOTA JIDOSHA KABUSHIKI KAISHA, Toyota (JP)

(72) Inventor: Katsuhiko Tatebe, Seto (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 209 days.

(21) Appl. No.: 16/570,474

(22) Filed: Sep. 13, 2019

(65) Prior Publication Data

US 2020/0099277 A1 Mar. 26, 2020

(30) Foreign Application Priority Data

Sep. 21, 2018 (JP) .............................. JP2018-177674

(51) Int. Cl.
| | | |
|---|---|---|
| B29C 70/68 | (2006.01) | |
| H02K 15/02 | (2006.01) | |
| H02K 15/12 | (2006.01) | |
| B29C 70/84 | (2006.01) | |
| B32B 15/08 | (2006.01) | |
| B32B 15/18 | (2006.01) | |

(Continued)

(52) U.S. Cl.
CPC ......... *H02K 15/024* (2013.01); *B29C 70/682* (2013.01); *B29C 70/84* (2013.01); *B32B 15/08* (2013.01); *B32B 15/18* (2013.01); *H02K 15/12* (2013.01); *B29K 2705/12* (2013.01); *B29K 2995/0008* (2013.01); *B29L 2031/749* (2013.01); *B32B 2260/046* (2013.01); *B32B 2307/208* (2013.01); *B32B 2457/00* (2013.01)

(58) Field of Classification Search
None
See application file for complete search history.

(56) References Cited

U.S. PATENT DOCUMENTS 2,906,977 A * 9/1959 Rowley ................... H01F 27/25
336/68
3,408,734 A * 11/1968 Leaby .................... H02K 15/02
29/596

(Continued)

FOREIGN PATENT DOCUMENTS

| JP | 2016-123242 A | 7/2016 |
| JP | 2018-026940 A | 2/2018 |

*Primary Examiner* — Edmund H Lee
(74) *Attorney, Agent, or Firm* — Dickinson Wright, PLLC

(57) ABSTRACT

To suppress positional deviations of magnetic members of a stacked core and prevent damage thereto when the stacked core is attached to a case. A method for producing a stacked core including a stack of foil-shaped magnetic members for fixation to a case with a fastening bolt includes preparing magnetic members each having formed therein a positioning opening, and a tubular collar adapted to be fastened to the case with the fastening bolt inserted therethrough, the tubular collar having a first receiving face for a head of the fastening bolt and a second receiving face for the case, stacking the magnetic members while arranging the collar within the opening, impregnating gaps between the stacked magnetic members as well as gaps between the openings of the magnetic members and the outer peripheral face of the collar with resin, and integrating the magnetic members with the collar by curing the resin.

4 Claims, 7 Drawing Sheets

(51) Int. Cl.
 *B29L 31/00* (2006.01)
 *B29K 705/12* (2006.01)

(56) References Cited

U.S. PATENT DOCUMENTS

| | | | | |
|---|---|---|---|---|
| 3,490,143 A | * | 1/1970 | Hull | H02K 15/024 |
| | | | | 29/596 |
| 5,759,589 A | * | 6/1998 | George, Jr. | B29C 39/10 |
| | | | | 425/129.1 |
| 5,948,338 A | * | 9/1999 | George, Jr. | B29C 70/68 |
| | | | | 264/272.15 |

* cited by examiner

METHOD FOR PRODUCING STACKED CORE

CROSS REFERENCE TO RELATED APPLICATIONS

The present application claims priority from Japanese patent application JP 2018-177674 filed on Sep. 21, 2018, the content of which is hereby incorporated by reference into this application.

BACKGROUND

Technical Field

The present disclosure relates to a method for producing a stacked core.

Background Art

As stacked cores for motors, those obtained by stacking steel plates as magnetic members containing soft magnetic materials are known. As a method for producing such type of stacked cores, a method of stacking a plurality of steel plates through swaging is known (for example, see JP 2016-123242 A). Each steel plate of the stacked core of JP 2016-123242 A is partially punched by about half the thickness of the plate, and a protrusion for positioning is formed on one of the faces of the steel plate, while a dent for positioning is formed on the rear face of the steel plate opposite to the protrusion. As a protrusion of one of a pair of steel plates and a dent of another one of the steel plates are swaged together, the steel plates are stacked while being positioned with respect to each other. Then, the stacked steel plates are bonded together with resin so that a stacked core of the plurality of steel plates is produced.

SUMMARY

However, in the stacked core described in JP 2016-123242 A, since a protrusion of one of overlapping steel plates (i.e., magnetic members) and a dent of another one of the steel plates are swaged together, if the steel plates are thin, the swaging margins of the steel plates are small, and thus, the steel plates become floated or have gaps generated therebetween, with the result that positional deviations cannot be suppressed. Meanwhile, as a method for producing a stacked core to which swaging is not applicable, there is known a method for producing a stacked core by stacking foil members containing soft magnetic materials as magnetic members, and impregnating gaps between the foil members with resin. However, such a method has a possibility that when the resulting stacked core is fixed to a case with fastening bolts, the stacked core may become damaged due to the axial force of the fastening bolts.

Exemplary embodiments of the present disclosure include a method for providing a stacked core that can suppress positional deviations of magnetic members of the stacked core and prevent damage to the magnetic members when the stacked core is attached to a case.

Accordingly, a method for producing a stacked core according to the present disclosure is a method for producing a stacked core, the stacked core including a stack of foil-shaped or plate-shaped magnetic members each containing a soft magnetic material, the stacked core being adapted to be fixed to a case with a fastening bolt, the method including preparing a plurality of magnetic members each having formed therein a positioning opening, and a tubular collar adapted to be fastened to a case with a fastening bolt inserted through the tubular collar, the tubular collar having one end face and another end face, the one end face serving as a first receiving face for a head of the fastening bolt, and the other end face serving as a second receiving face for the case, stacking the magnetic members while arranging the collar within the openings of the magnetic members, impregnating gaps between the plurality of stacked magnetic members with resin, and also impregnating gaps between the openings of the plurality of magnetic members and an outer peripheral face of the collar with resin, and integrating the plurality of magnetic members with the collar by curing the resin impregnating the gaps.

According to such a configuration, the plurality of magnetic members are stacked while being positioned as the collar is inserted through the openings of the magnetic members. Since a gap for resin impregnation is provided between the openings of the magnetic members and the outer peripheral face of the collar, the magnetic members are smoothly stacked while the collar is inserted through the openings. In addition, since the plurality of magnetic members and the collar are integrated via the resin after the magnetic members are stacked, there is no possibility that the collar will come off the magnetic members even when the collar is smaller than the openings of the magnetic members. When the stacked core is fixed to the case, the first receiving face of the collar receives axial force from the fastening bolt, and the second receiving face of the collar receives reaction force from the case. Therefore, compressive stress that would act on the stacked core can be suppressed. As described above, when the magnetic members are stacked, the collar can be allowed to function as a positioning member, and when the stacked core is fixed to the case, the collar can be allowed to function as a protective member for protecting the stacked core from the fastening bolt.

At least one end of the collar need not protrude in the integrating as long as the first and second receiving faces can receive the axial force of the fastening bolt. In some embodiments, the integrating includes curing the resin while pressurizing the plurality of magnetic members in the stacked direction, thereby allowing at least one end of the collar to protrude beyond at least one of opposite ends of the magnetic members in the stacked direction. According to such a configuration, at least one end of the collar protrudes beyond the stacked core. Therefore, there is no possibility that the stacked core will be sandwiched between the head of the fastening bolt and the installation plane of the case, or compressive stress will act on the stacked core.

The crystal structure of each magnetic member is not particularly limited as long as the magnetic member contains a soft magnetic material. In some embodiments, the preparing includes preparing foil members each containing a soft magnetic material with an amorphous structure or a nanocrystal structure as the magnetic members. According to such a configuration, excellent magnetic properties can be obtained using a low-loss material with an amorphous structure or a nanocrystal structure. In addition, although a foil member with an amorphous structure or a nanocrystal structure is relatively harder and brittler as compared to a magnetic member containing a commonly known soft magnetic material, such as an electromagnetic steel plate, and is easily damaged due to the axial force of the fastening bolt, damage to the foil member can be prevented as the collar receives axial force from the fastening bolt.

The stacking may include, for example, stacking the magnetic members while inserting the collar through the openings of the magnetic members. In some embodiments, the stacking includes arranging the collar in upright position on a base, and stacking the magnetic members while arranging the collar in upright position within the openings of the magnetic members. According to such a configuration, the magnetic members can be smoothly stacked while being positioned with the collar used as a guide.

According to the present disclosure, when the magnetic members are stacked, the collar functions as a positioning member, and when the stacked core is fixed to a case, the collar functions as a protective member for protecting the magnetic members from the fastening bolt. Accordingly, positional deviations of the magnetic members can be suppressed and damage to the magnetic members can be prevented when the stacked core is attached to the case.

DETAILED DESCRIPTION

Figure 1:
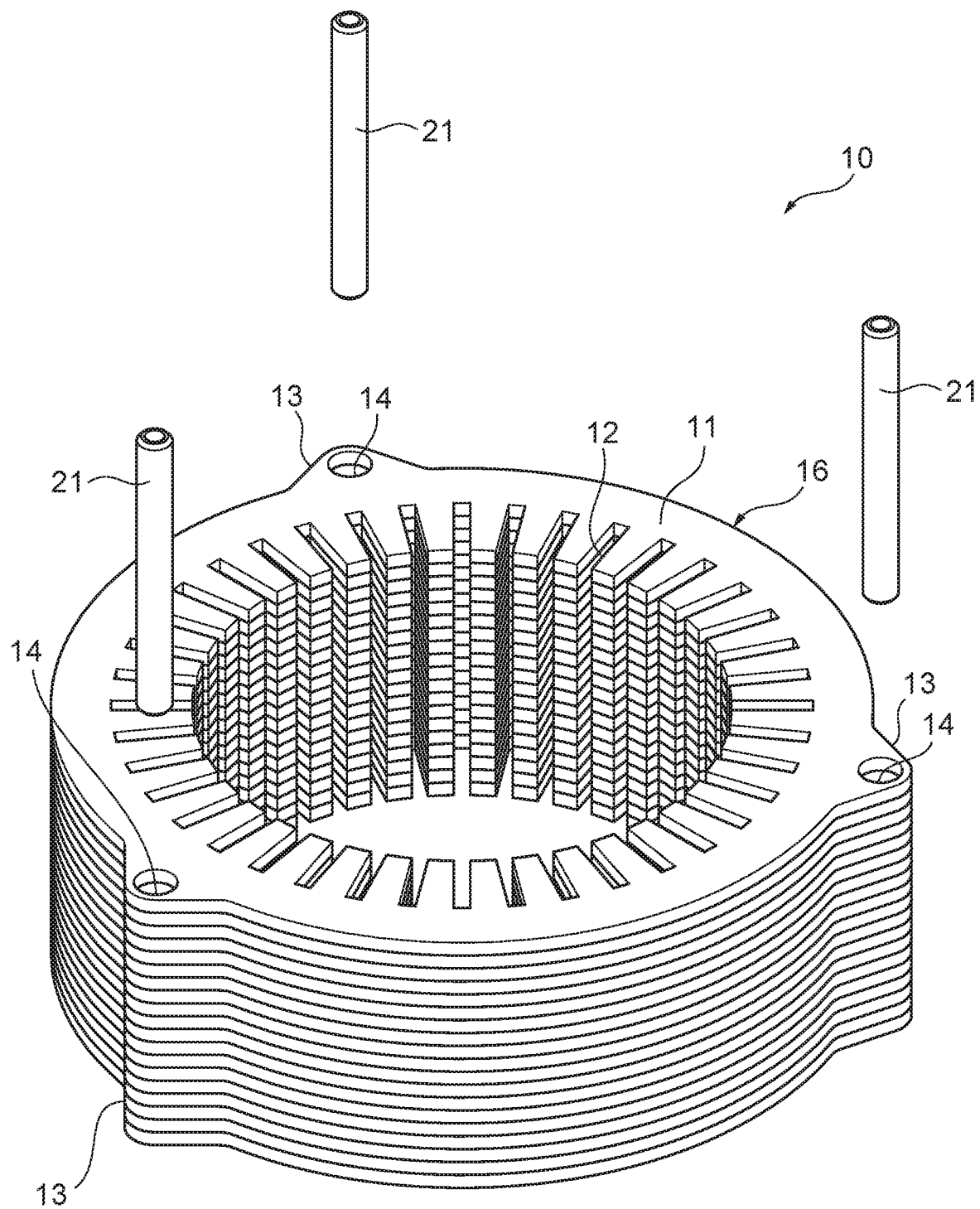
FIG. 1 is a perspective view of the appearance of a stacked core according to an embodiment.

Hereinafter, a stacked core of the present embodiment will be described. FIG. 1 is a perspective view of the appearance of a stacked core according to the present embodiment. It should be noted that FIG. 1 illustrates a state in which collars are removed from the stacked core for simplicity of the description. Although the following description illustrates an example in which the stacked core of the present embodiment is used for a stator of an in-vehicle motor of a hybrid vehicle or an electric vehicle, the stacked core can also be used for any applications other than in-vehicle motors.

As illustrated in FIG. 1, the stacked core 10 has a stack of a plurality of magnetic members 16 formed by stamping steel plates into the same shape, and collars 21 attached to the stack. The stacked core 10 is used as a stator arranged around a rotor (not illustrated) and partially forms an in-vehicle motor. The stacked core 10 includes an annular yoke portion 11, a plurality of teeth portions 12 radially extending inward from the inner peripheral face of the yoke portion 11, and three bulging portions 13 radially bulging outward from the outer peripheral face of the yoke portion 11. The yoke portion 11 is formed in an annular shape that is adapted to have the rotating shaft of the rotor as the center, and a space for housing the rotor is secured on the radially inner side of the plurality of teeth portions 12.

The plurality of teeth portions 12 are arranged at regular intervals on the inner peripheral face of the yoke portion 11 in the circumferential direction. Each teeth portion 12 has wound thereon a conductive wire with an insulating film, thus forming a coil 29 (see FIG. 7). Each of the three bulging portions 13 has formed therein a through-hole 14 passing through the magnetic members 16 in the stacked direction, and each through-hole 14 is provided with a tubular collar 21 for protecting the magnetic members 16 from a fastening bolt 25 (see FIG. 7). The stacked core 10 with such a configuration has the fastening bolts 25 inserted through the inside of the collars 21, and the fastening bolts 25 are fastened to a case 28 (see FIG. 7) so as to fix the stacked core 10 to the case 28.

Figure 2:
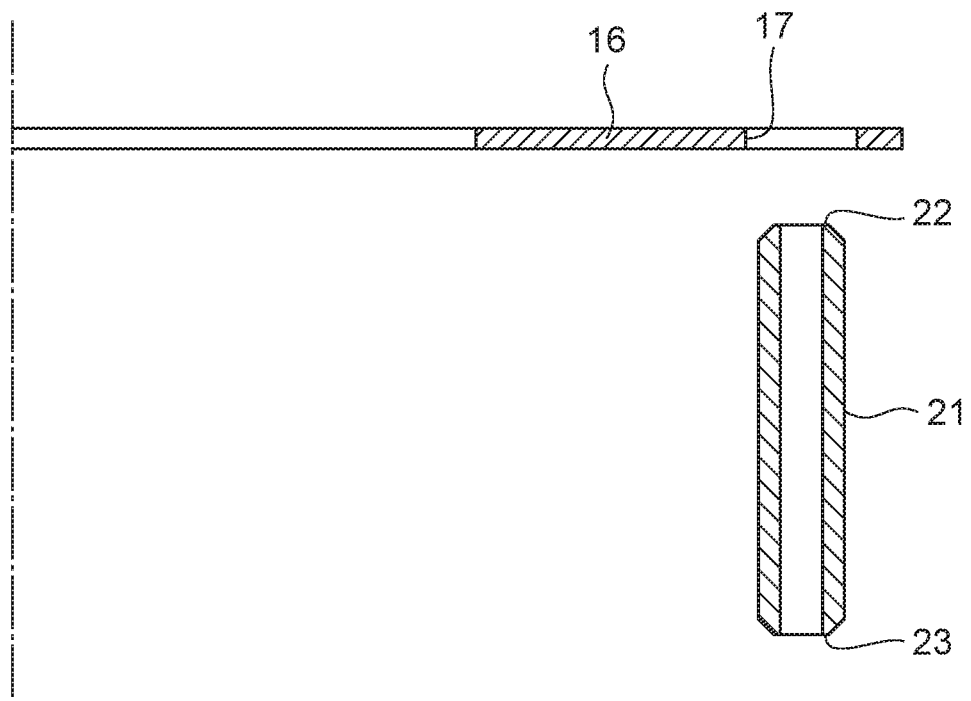
FIG. 2 is a view of an exemplary step of preparing magnetic members and collars according to an embodiment.
Figure 5:
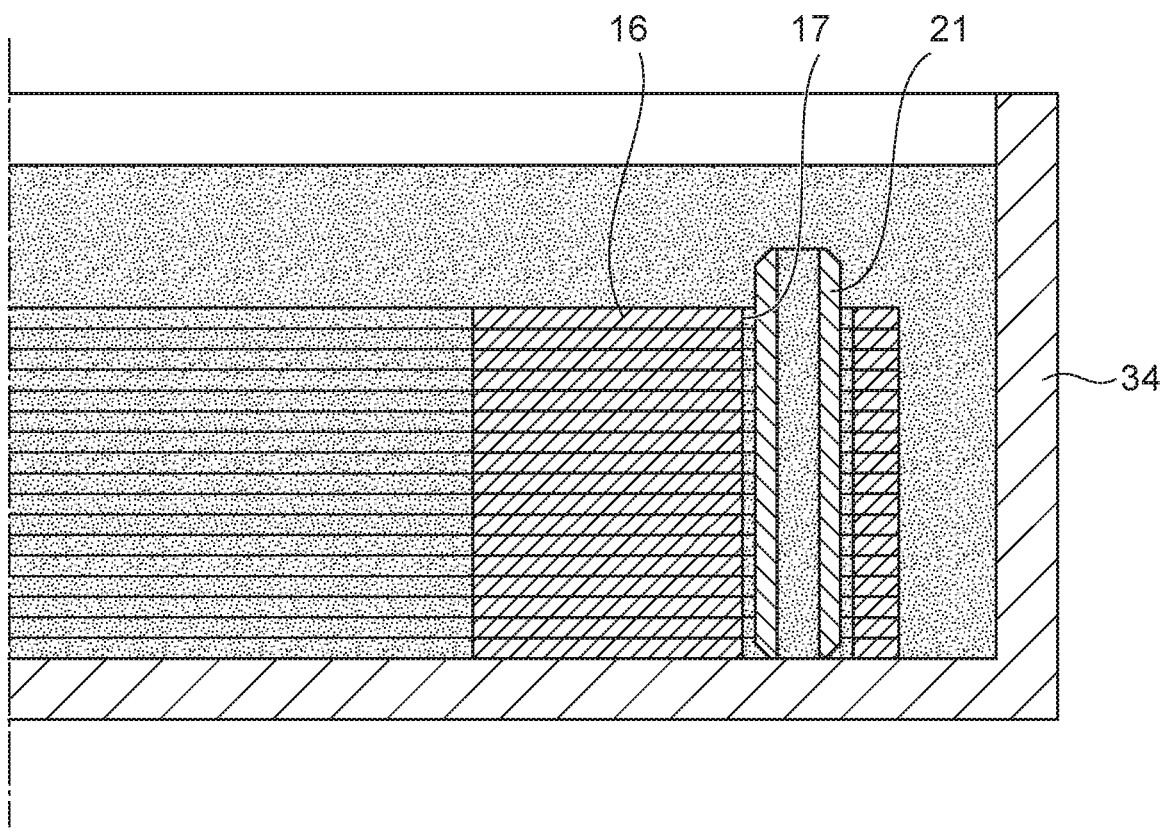
FIG. 5 is a view of an exemplary resin impregnation step according to an embodiment.
Figure 6:
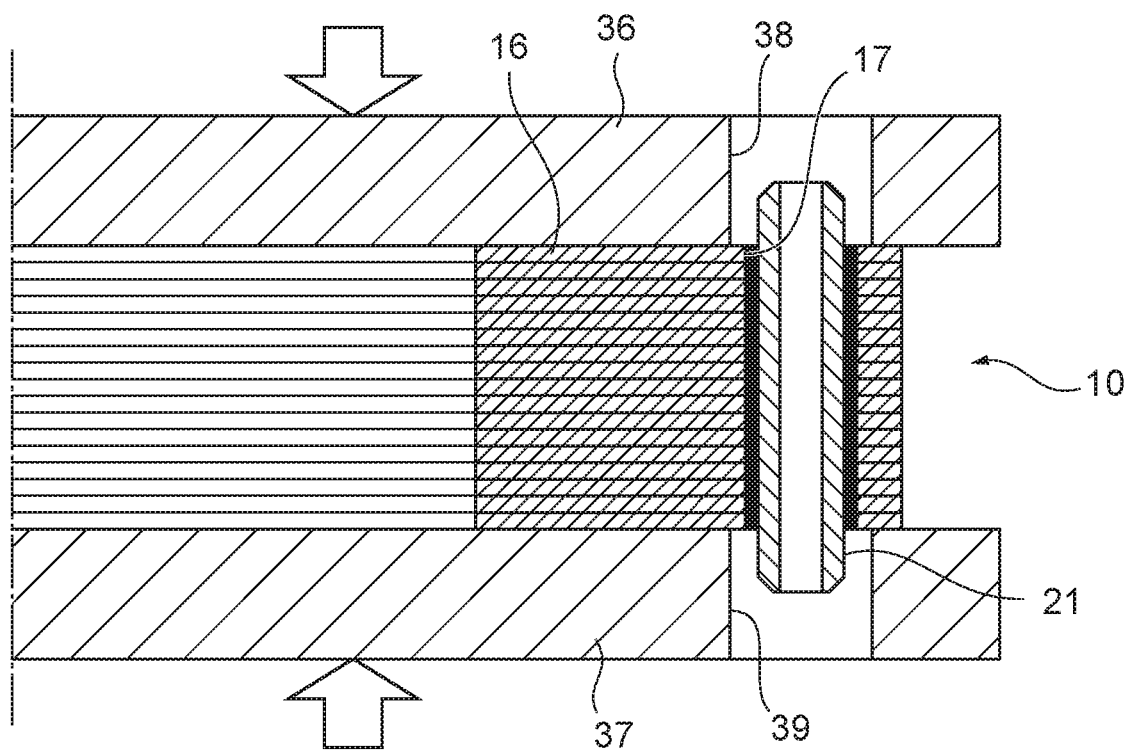
FIG. 6 is a view of an exemplary step of integrating magnetic members with a collar according to an embodiment.
Figure 7:
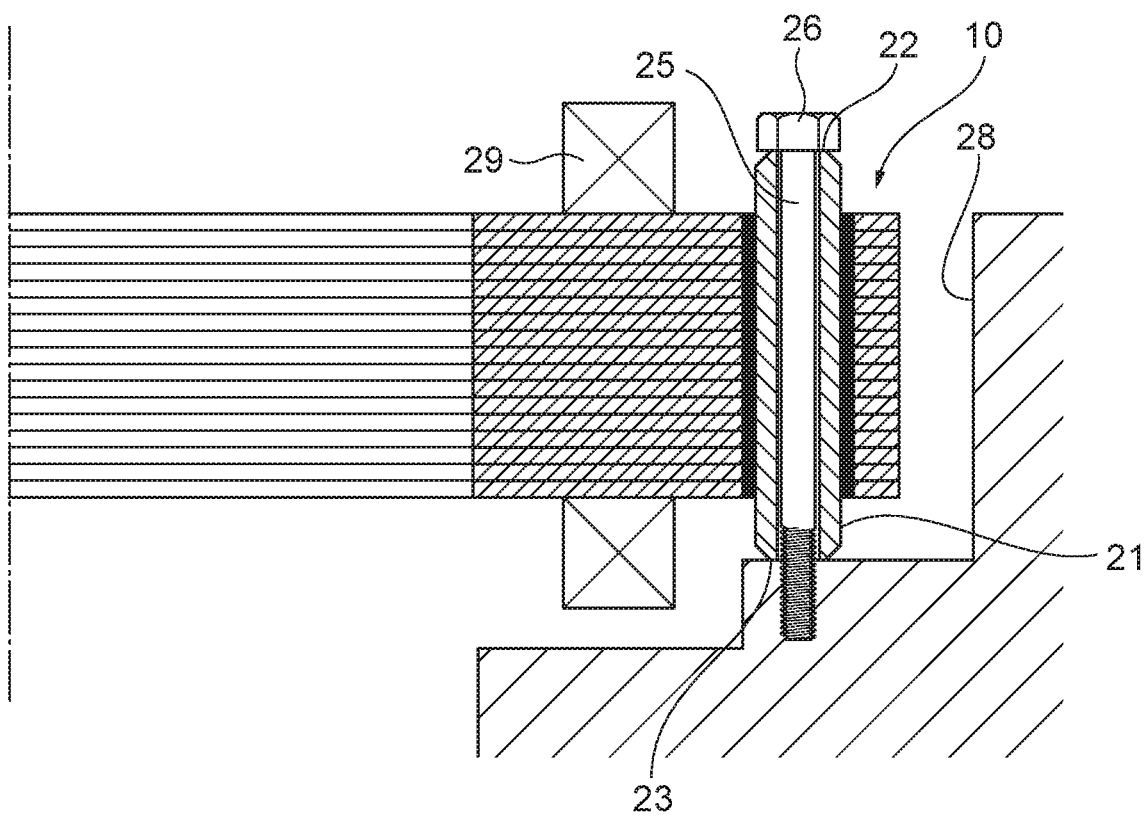
FIG. 7 is a view of an exemplary step of attaching a stacked core to a case according to an embodiment.

Next, a method for producing the stacked core according to the present embodiment will be described with reference to FIGS. 2 to 7. FIG. 2 illustrates a step of preparing magnetic members and collars, FIGS. 3 and 4 each illustrate a step of stacking magnetic members, FIG. 5 illustrates a step of impregnating the magnetic members and the collar with resin, FIG. 6 illustrates a step of integrating the magnetic members with the collar, and FIG. 7 illustrates a step of attaching the stacked core to the case.

(Step of Preparing Magnetic Members and Collars)

As illustrated in FIG. 2, first, the plurality of magnetic members 16 each containing a soft magnetic material and the tubular collars 21 are prepared. Each magnetic member 16 has been obtained by stamping a steel plate into a shape corresponding to the planar shape of the stacked core 10 (see FIG. 1), and has openings 17 at positions corresponding to the through-holes 14 of the stacked core 10. That is, the plurality of magnetic members 16 are continuous in the stacked direction, thus forming the yoke portion 11, the teeth portions 12, and the bulging portions 13, and also, the openings 17 are continuous in the stacked direction, thus forming the through-holes 14 (see FIG. 1). Foil-shaped or plate-shaped magnetic members 16 can be used for the stacked core 10. In the present embodiment, foil members each containing a soft magnetic material with an amorphous structure or a nanocrystal structure are used for the magnetic members 16.

It should be noted that the "amorphous structure" is a structure in which no clear peaks can be found in its X-ray diffraction pattern and only a broad halo pattern is observed. The "nanocrystal structure" is a structure formed by applying heat treatment to an amorphous structure and in which analysis peaks are observed at positions corresponding to gaps between the lattices on the crystal plane. The "nanocrystal structure" usually means a structure with a crystallite size of less than 1 μm as calculated from the full width at half maximum (FWHM) of a diffraction peak of a X-ray diffraction pattern, using the Scherrer equation. In the present embodiment, the crystallite size (i.e., crystallite size calculated using the Scherrer equation) of the nanocrystals may be less than or equal to 100 nm, or less than or equal to 50 nm and greater than or equal to 5 nm. Nanocrystals with a crystallite size in such a range can obtain excellent magnetic properties.

Examples of a soft magnetic material with an amorphous structure or a nanocrystal structure include, but are not limited to, a soft magnetic material containing at least one magnetic metal selected from the group consisting of Fe, Co, and Ni, and at least one nonmagnetic metal selected from the group consisting of B, C, P, Al, Si, Ti, V, Cr, Mn, Cu, Y, Zr, Nb, Mo, Hf, Ta, and W. The thickness of each foil member with an amorphous structure or a nanocrystal structure may be 5 to 50 μm or 15 to 35 μm, for example.

Typical examples of the soft magnetic material with an amorphous structure or a nanocrystal structure include, but are not limited to, FeCo alloy (e.g., FeCo or FeCoV), FeNi alloy (e.g., FeNi, FeNiMo, FeNiCr, or FeNiSi), FeAl alloy or FeSi alloy (e.g., FeAl, FeAlSi, FeAlSiCr, FeAlSiTiRu, or FeAlO), FeTa alloy (e.g., FeTa, FeTaC, or FeTaN), and FeZr alloy (e.g., FeZrN).

The soft magnetic material with an amorphous structure can be formed by, for example, melting a metal raw material, which has been obtained through mixing to attain the aforementioned composition, at a high temperature using a high-frequency melting furnace or the like so as to obtain uniform molten metal, and rapidly quenching the molten metal. The quenching rate may be any rate as long as an amorphous structure can be obtained before crystallization occurs. For example, it may be about $10^{6°}$ C./sec. Meanwhile, the soft magnetic material with a nanocrystal structure can be obtained by, for example, applying heat treatment to a soft magnetic material with an amorphous structure at a temperature greater than or equal to the temperature that causes crystallization. The heat treatment temperature may be greater than or equal to 350° C. or greater than or equal to 400° C., for example. Setting the heat treatment temperature to greater than or equal to 400° C. will help crystallization progress efficiently. In addition, the heat treatment temperature may be less than or equal to 600° C. or less than or equal to 520° C., for example. Setting the heat treatment temperature to less than or equal to 520° C. can prevent excessive crystallization and suppress generation of by-products.

Each collar 21 is formed in a tubular shape using a metallic material, such as cast iron. The collars 21 function as members for positioning the plurality of magnetic members 16 when the magnetic members 16 are stacked (see FIG. 4), and function as protective members for protecting the magnetic members 16 from the fastening bolts 25 when the stacked core 10 is attached to the case 28 (see FIG. 7). The outer peripheral face of each collar 21 is dimensioned to allow the collar 21 to loosely fit within the opening 17 of each magnetic member 16, and a gap of less than or equal to 20 μm is provided between the opening 17 of each magnetic member 16 and the outer peripheral face of the collar 21, for example. Providing the gap between the opening 17 of each magnetic member 16 and the outer peripheral face of the collar 21 can prevent damage to the magnetic member 16 when the collar 21 is inserted through the opening 17.

In addition, each collar 21 has a length that allows the opposite ends of the collar 21 to protrude beyond the upper and lower faces of the stacked core 10 (see FIG. 7). In a state in which the fastening bolt 25 is inserted through the inside of the collar 21 and the stacked core 10 is fastened to the case 28, one of the end faces of the collar 21 serves as a first receiving face 22 for a head 26 of the fastening bolt 25, and the other end face of the collar 21 serves as a second receiving face 23 for the case 28. The first receiving face 22 protruding beyond the upper face of the stacked core 10 intensively receives axial force from the fastening bolt 25, and the second receiving face 23 protruding beyond the lower face of the stacked core 10 intensively receives reaction force from the case 28 so that the collar 21 can protect the stacked core 10 from the axial force of the fastening bolt 25.

(Step of Stacking Magnetic Members)

Figure 3:
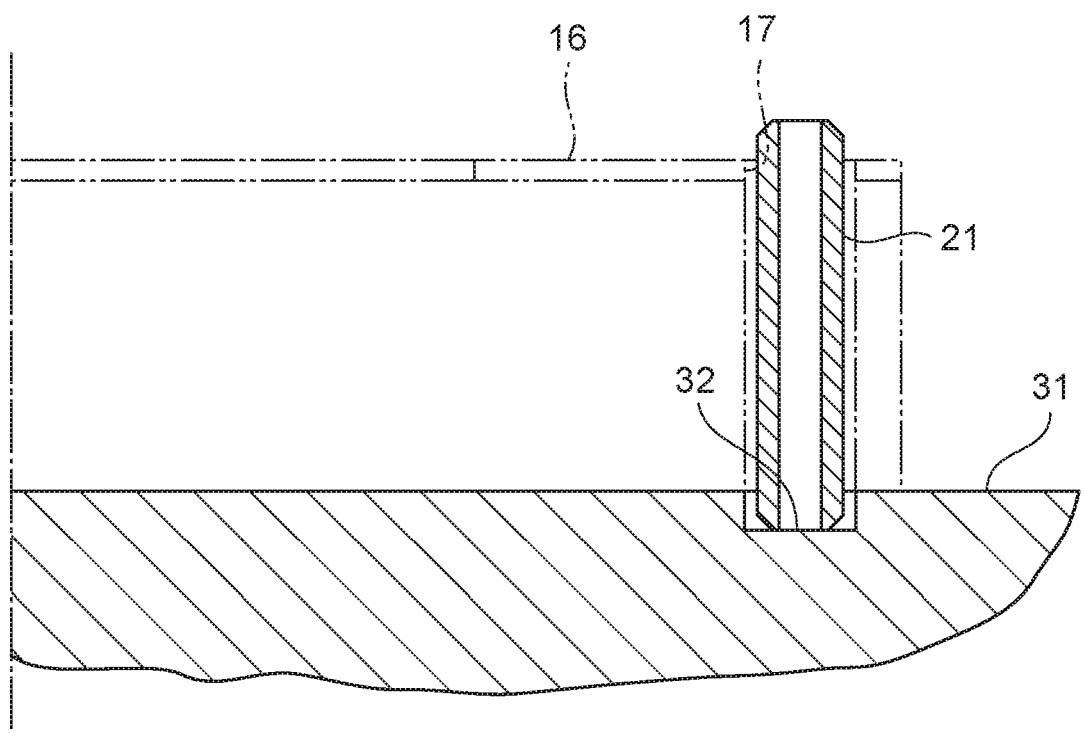
FIG. 3 is a view of an exemplary step of stacking magnetic members according to an embodiment.

As illustrated in FIG. 3, the collars 21 are arranged in upright position on three respective recesses 32 of a base 31. The recesses 32 are formed on the base 31 at positions corresponding to the three respective openings 17 of each magnetic member 16. The outside diameter of each recess 32 is slightly greater than that of each collar 21 so that the collar 21 is supported in the recess 32 so as to be freely inserted in or removed from the recess 32. The length of each collar 21 is greater than the sum of the depth of the recess 32 and the heights of the magnetic members 16 stacked on the base 31. Accordingly, while the magnetic members 16 are stacked, the upper end of each collar 21 always protrudes beyond the magnetic members 16.

Figure 4:
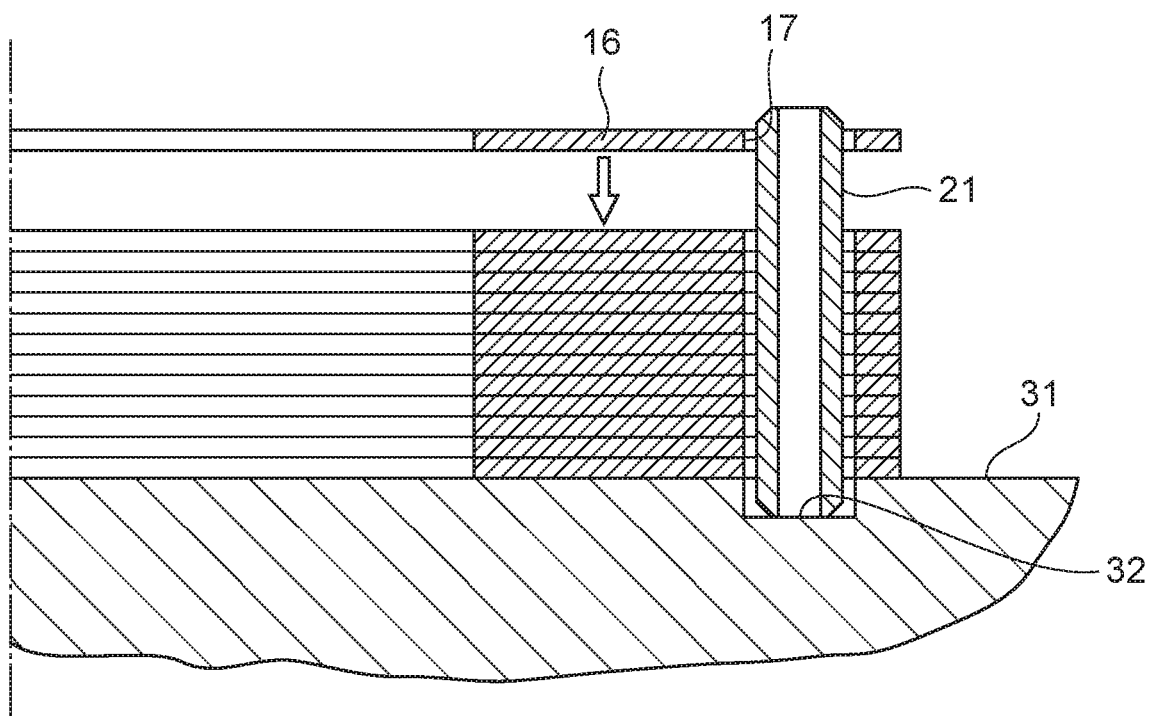
FIG. 4 is a view of an exemplary step of stacking magnetic members according to an embodiment.

As illustrated in FIG. 4, the magnetic members 16 are stacked while the collars 21 are arranged within the three respective openings 17 formed in the magnetic members 16. In such a case, the openings 17 of the magnetic members 16 are positioned above the collars 21, and the magnetic members 16 are lowered toward the base 31 with the collars 21 used as guides so that the magnetic members 16 are stacked. Since the plurality of magnetic members 16 are positioned with respect to the three collars 21, positional deviations of the magnetic members 16 in the direction of rotation and the axial direction can be suppressed. Further, since there are slight gaps between the openings 17 of the magnetic members 16 and the outer peripheral faces of the collars 21, the magnetic members 16 can be stacked smoothly.

By the way, usually, fit dimensions between the opening 17 of each magnetic member 16 and each collar 21 are set such that they satisfy press fit dimensions to eliminate the gap between the magnetic member 16 and the collar 21. However, when a hard, brittle foil member, such as a soft magnetic material with an amorphous structure or a nanocrystal structure, is used as each magnetic member 16, cracks may be generated in the magnetic member 16 while the collar 21 is press-fitted into the opening 17 of the magnetic member 16. Meanwhile, when there are gaps between the openings 17 of the magnetic members 16 and the outer peripheral faces of the collars 21, the plurality of magnetic members 16 and the collars 21 cannot be integrated by fitting the collars 21 into the magnetic members 16. Therefore, in the present embodiment, gaps are provided between the openings 17 of the magnetic members 16 and the collars 21 in advance so as to suppress damage to the magnetic members 16 when they are stacked, and after the magnetic members 16 are stacked, the plurality of magnetic members 16 and the collars 21 are integrated through resin impregnation.

The gaps between the openings 17 of the magnetic members 16 and the outer peripheral faces of the collars 21 are within the tolerance of the positioning accuracy of the plurality of magnetic members 16. Since positional deviations of the magnetic members 16 with respect to the collars 21 are within the tolerance of the positioning accuracy, a decrease in the positioning accuracy of the magnetic members 16 can be suppressed and gaps that can avoid press-fit can be secured between the openings 17 of the magnetic members 16 and the outer peripheral faces of the collars 21. Accordingly, even when the magnetic members 16 are hard and brittle like foil members with an amorphous structure or a nanocrystal structure, the collars 21 can be inserted through the openings 17 of the magnetic members 16 without damaging the magnetic members 16. Each gap may be narrower than the thickness of each magnetic member 16, for example. This allows the magnetic member 16 to easily engage the collar 21 with a gap formed around a part of the magnetic member 16.

(Resin Impregnation Step)

As illustrated in FIG. 5, gaps between the plurality of magnetic members 16 are impregnated with resin, and also, gaps between the openings 17 of the plurality of magnetic members 16 and the outer peripheral faces of the collars 21 are impregnated with resin. In such a case, uncured resin (i.e., uncured thermosetting resin) is stored in a liquid tank 34, and the plurality of magnetic members 16 and the collars 21 are immersed in a solution of the uncured resin in the liquid tank 34. As the resin enters the gaps between the plurality of magnetic members 16 as well as the gaps between the plurality of magnetic members 16 and the collars 21, the plurality of magnetic members 16 and the collars 21 are temporarily joined together with the resin. Accordingly, even when the magnetic members 16 and the collars 21 are taken out of the liquid tank 34, the collars 21 will not come off the openings 17 of the plurality of magnetic members 16.

(Step of Integrating the Plurality of Magnetic Members with Collars)

As illustrated in FIG. 6, uncured resin impregnating the plurality of magnetic members 16 and the collars 21 is cured so that the plurality of magnetic members 16 and the collars 21 are integrated via the resin. In such a case, a pair of upper and lower pressure jigs 36 and 37 are prepared and the plurality of magnetic members 16 impregnated with the resin are held between the pressure jigs 36 and 37. The pressure jigs 36 and 37 have formed therein clearance holes 38 and 39, respectively, at positions corresponding to the collar 21 so that contact between the collar 21 and the pressure faces of the pressure jigs 36 and 37 is avoided. The plurality of magnetic members 16 are pressurized in the stacked direction by the pressure jigs 36 and 37 until the distance between the opposed pressure faces of the pressure jigs 36 and 37 reaches a target dimension of the stacked core 10.

When the plurality of magnetic members 16 are pressurized in the stacked direction, the thickness of the stack of the plurality of magnetic members 16 starts to decrease, and also, the amount of protrusion of each collar 21 beyond the stack starts to relatively increase with the decrease in the thickness of the stack. In the present embodiment, the upper ends of the collars 21 already protrude beyond the upper end of the magnetic members 16 in the stacked direction in the aforementioned resin impregnation step (see FIG. 5). However, as the plurality of magnetic members 16 are pressurized, the lower ends of the collars 21 also protrude beyond the lower end of the magnetic members 16 in the stacked direction. It should be noted that the opposite ends of the collars 21 may already protrude beyond the opposite ends of the magnetic members 16 in the stacked direction in the resin impregnation step.

While the plurality of magnetic members 16 are pressurized by the pressure jigs 36 and 37, uncured resin between the plurality of magnetic members 16 as well as uncured resin between the openings 17 of the plurality of magnetic members 16 and the outer peripheral faces of the collars 21 are heated and cured with a heating furnace or the like. Accordingly, the plurality of magnetic members 16 and the collars 21 are integrated via the resin while the opposite ends of the collars 21 protrude beyond the opposite ends of the magnetic members 16 in the stacked direction, so that the stacked core 10 is formed. In addition, since the pressure faces of the pressure jigs 36 and 37 are surface-coated with a release agent and clearance is provided between the inner peripheral faces of the clearance holes 38 and 39 and the outer peripheral faces of the collars 21, fixation of the magnetic members 16 and the collars 21 to the pressure jigs 36 and 37 after the uncured resin is cured is suppressed.

Although thermosetting resin is used as the resin in the present embodiment, thermoplastic resin may also be used. In such a case, gaps between the plurality of magnetic members 16 as well as gaps between the openings 17 of the plurality of magnetic members 16 and the outer peripheral faces of the collars 21 may be impregnated with thermoplastic resin that has softened, and then, the plurality of magnetic members 16 may be cooled while being pressurized in the stacked direction until the thermoplastic resin cures. Examples of thermosetting resin include epoxy resin, phenol resin, urea resin, and melamine resin. Examples of thermoplastic resin include polyethylene resin, polyamide resin, polystyrene resin, and acrylic resin. After the stacked core 10 is formed, a conductive wire with an insulating film is wound on each teeth portion 12 of the stacked core 10 so that the coil 29 is formed, though the details are omitted herein (see FIG. 7).

(Step of Attaching Stacked Core to Case)

As illustrated in FIG. 7, the stacked core 10 with the coil wound thereon is fixed to the case 28 with the fastening bolts 25. In such a case, the stacked core 10 is fastened to the case 28 with the fastening bolts 25 inserted through the inside of the collars 21, but since the opposite ends of the collars 21 protrude beyond the stacked core 10, the stacked core 10 will not contact the heads 26 of the fastening bolts 25 or the installation plane of the case 28. The first receiving face 22, which is one end face, of each collar 21 intensively receives the axial force of the head 26 of each fastening bolt 25, while the second receiving face 23, which is the other end face, of the collar 21 intensively receives reaction force from the case 28. Since the axial force of the fastening bolts 25 acts only on the collars 21, compressive stress is prevented from acting on the stacked core 10.

Herein, when plate-shaped or foil-shaped magnetic members 16 each containing a soft magnetic material are used, for example, resin is provided between the magnetic members 16 or gaps are formed between the magnetic members 16. Therefore, if the collars 21 are not provided, the magnetic members 16 will directly receive the axial force of the fastening bolts 25 so that the resin or the gaps will likely to be squashed, thus deforming the magnetic members 16. In particular, when the magnetic members 16 are foil members as in the present embodiment, the number of the stacked foil members should be increased as the foil members are thinner. This will increase the amount of deformation of the entire stack due to the axial force of the fastening bolts 25. In addition, since the axial force of the fastening bolts 25 acts on the stack of the magnetic members 16, creep may be generated with the elapse of time. However, in the present embodiment, since the axial force of the fastening bolts 25 does not act on the magnetic members 16, deformation of the magnetic members 16 during attachment of the stacked core 10 to the case 28 and creep that would be generated with the elapse of time after the attachment can be effectively suppressed. In addition, since the gaps between the through-holes 14 of the stacked core 10 and the outer peripheral faces of the collars 21 are filled with resin, positional deviations of the collars 21 with respect to the magnetic members 16 while the fastening bolts 25 are fastened can be suppressed.

As described above, in the step of producing the stacked core 10 of the present embodiment, the collars 21, which are dimensioned to loosely fit within the openings 17 of the magnetic members 16, are used, and while the collars 21 are inserted through the openings 17, the magnetic members 16 are stacked while being positioned with respect to the collars 21 (see FIG. 4). Then, after the magnetic members 16 are stacked, the magnetic members 16 and the collars 21 are integrated through resin impregnation (see FIGS. 5 and 6). Accordingly, the magnetic members 16 can be smoothly stacked while being positioned with respect to the collars 21, and the magnetic members 16 and the collars 21 can be integrated with the gaps between the openings 17 of the magnetic members 16 and the collars 21 filled with the resin. Further, when the stacked core 10 is fixed to the case 28, the collars 21 receive axial force from the fastening bolts 25. Therefore, deformation of the magnetic members 16 after the fastening bolts 25 are fastened can be suppressed, and the fastening bolts 25 will not become loose. In particular, even when the magnetic members 16 are hard and brittle like foil members with an amorphous structure or a nanocrystal structure, there is no possibility that the magnetic members 16 will become damaged as the axial force of the fastening bolts 25 will not act on the magnetic members 16. In addition, when the magnetic members 16 are stacked, the collars 21 can be allowed to function as positioning members, and when the stacked core 10 is fastened to the case, the collars 21 can be allowed to function as protective members for protecting the stacked core 10 from the fastening bolts 25.

Although foil members with an amorphous structure or a nanocrystal structure are used as the exemplary magnetic members 16 in the present embodiment, electromagnetic steel plates that are thicker than foil members may also be used. In such a case, in the step of stacking the magnetic members 16, the collars 21 may be arranged in upright position on the base 31 similarly to when foil members are used, and electromagnetic steel plates may be stacked while the collars 21 in upright position are arranged within the openings 17 of the electromagnetic steel plates. Alternatively, the collars 21 may be inserted through the openings 17 after the electromagnetic steel plates are stacked on the base 31.

Further, although the present embodiment illustrates a configuration in which the opposite ends of each collar 21 protrude beyond the stacked core 10, it is acceptable as long as at least one end of each collar 21 protrudes beyond the stacked core 10. Even in such a configuration, there is no possibility that the stacked core 10 will be sandwiched between the heads 26 of the fastening bolts 25 and the case 28. Therefore, the axial force of the fastening bolts 25 can be allowed to concentrate on the collars 21, and compressive stress can be prevented from acting on the magnetic members 16. In addition, instead of allowing each collar 21 to protrude beyond the stacked core 10, the outside diameter of the collar 21 may be set larger than that of the head 26 of each fastening bolt 25 so as to avoid contact between the head 26 of the fastening bolt 25 and the stacked core 10.

Although the present embodiment has been described above, other embodiments can also be implemented by partially or entirely combining the present embodiment with modified examples. Further, the technique of the present disclosure is not limited to the present embodiment, and can be changed, replaced, or modified in various ways within the spirit and scope of the technical idea of the present disclosure. Furthermore, the technical idea of the present disclosure can be implemented using another method as long as such a method is available with the progress of the technology or another derived technology. Therefore, the appended claims entirely cover embodiments that can be included in the scope of the technical idea of the present disclosure.

DESCRIPTION OF SYMBOLS

10 Stacked core
16 Magnetic member
25 Fastening bolt
21 Collar
28 Case
17 Opening
22 First receiving face
23 Second receiving face
31 Base

What is claimed is:

1. A method for producing a stacked core, the stacked core including a stack of foil-shaped or plate-shaped magnetic members each containing a soft magnetic material, the stacked core being adapted to be fixed to a case with a fastening bolt, the method comprising:
preparing a plurality of magnetic members each having formed therein a positioning opening, and a tubular collar adapted to be fastened to a case with a fastening bolt inserted through the tubular collar, the tubular collar having one end face and another end face, the one end face serving as a first receiving face for a head of the fastening bolt, and the other end face serving as a second receiving face for the case;
stacking the magnetic members while arranging the collar within the openings of the magnetic members;
impregnating gaps between the plurality of stacked magnetic members with resin, and also impregnating gaps between the openings of the plurality of magnetic members and an outer peripheral face of the collar with resin; and
integrating the plurality of magnetic members with the collar by curing the resin impregnating the gaps.

2. The method for producing the stacked core according to claim 1, wherein the integrating includes curing the resin while pressurizing the plurality of magnetic members in a stacked direction, thereby allowing at least one end of the collar to protrude beyond at least one of opposite ends of the magnetic members in the stacked direction.

3. The method for producing the stacked core according to claim 1, wherein the preparing includes preparing foil members each containing a soft magnetic material with an amorphous structure or a nanocrystal structure as the magnetic members.

4. The method for producing the stacked core according to claim 1, wherein the stacking includes arranging the collar in upright position on a base, and stacking the magnetic members while arranging the collar in upright position within the openings of the magnetic members.

* * * * *